US012162173B2

(12) United States Patent
Han

(10) Patent No.: US 12,162,173 B2
(45) Date of Patent: Dec. 10, 2024

(54) RAZOR CARTRIDGE

(71) Applicant: DORCO CO., LTD., Seoul (KR)

(72) Inventor: Da Woon Han, Seoul (KR)

(73) Assignee: DORCO CO., LTD., Seoul (KR)

( * ) Notice: Subject to any disclaimer, the term of this patent is extended or adjusted under 35 U.S.C. 154(b) by 0 days.

(21) Appl. No.: 17/109,062

(22) Filed: Dec. 1, 2020

(65) Prior Publication Data

US 2021/0170614 A1 Jun. 10, 2021

(30) Foreign Application Priority Data

Dec. 10, 2019 (KR) ........................ 10-2019-0164112

(51) Int. Cl.
*B26B 21/40* (2006.01)

(52) U.S. Cl.
CPC ................................ *B26B 21/4018* (2013.01)

(58) Field of Classification Search
CPC . B26B 21/4018; B26B 21/40; B26B 21/4012; B26B 21/4025
See application file for complete search history.

(56) References Cited

U.S. PATENT DOCUMENTS

| | | | | |
|---|---|---|---|---|
| 5,687,485 | A | 11/1997 | Shurtleff et al. | |
| 5,761,814 | A | 6/1998 | Anderson et al. | |
| 5,794,343 | A | 8/1998 | Lee et al. | |
| 5,956,848 | A | 9/1999 | Tseng et al. | |
| 5,956,851 | A | 9/1999 | Apprille et al. | |
| 6,041,926 | A | 3/2000 | Petricca et al. | |
| 6,052,903 | A | 4/2000 | Metcalf et al. | |
| 6,185,822 | B1 | 2/2001 | Tseng et al. | |
| 6,212,777 | B1 | 4/2001 | Gilder et al. | |
| 6,216,345 | B1 * | 4/2001 | Andrews | B26B 21/22 30/34.2 |
| 6,442,839 | B1 | 9/2002 | Tseng et al. | |
| 6,516,518 | B1 | 2/2003 | Garraway et al. | |
| 6,612,040 | B2 | 9/2003 | Gilder | |
| 6,684,513 | B1 | 2/2004 | Clipstone et al. | |

(Continued)

FOREIGN PATENT DOCUMENTS

| | | |
|---|---|---|
| JP | 2005349221 | 12/2005 |
| KR | 1020060110368 | 10/2006 |

(Continued)

OTHER PUBLICATIONS

Korean Intellectual Property Office Application No. 10-2019-0164112, Office Action dated Aug. 6, 2021, 4 pages.

(Continued)

*Primary Examiner* — Adam J Eiseman
*Assistant Examiner* — Liang Dong
(74) *Attorney, Agent, or Firm* — Knobbe, Martens, Olson & Bear, LLP

(57) ABSTRACT

The present disclosure provides a razor cartridge. According to at least one embodiment of the present disclosure, a razor cartridge includes at least one shaving blade having a cutting edge, a blade housing configured to receive the at least one shaving blade in a longitudinal direction, and an edge portion disposed on each of both lateral sides of the blade housing and including a plurality of edge protrusions formed on a corresponding surface of each edge portion.

1 Claim, 9 Drawing Sheets

(56) References Cited

U.S. PATENT DOCUMENTS

| | | | | |
|---|---|---|---|---|
| 2005/0188539 | A1* | 9/2005 | Prudden | B26B 21/443 30/41 |
| 2008/0209734 | A1* | 9/2008 | Nicoll | B26B 21/222 30/41 |
| 2008/0229583 | A1* | 9/2008 | Fischer | B26B 21/4018 30/34.2 |
| 2009/0223057 | A1* | 9/2009 | Coope-Epstein | B26B 21/44 30/41 |
| 2011/0041340 | A1* | 2/2011 | Sherman | B26B 21/4025 30/50 |
| 2021/0016458 | A1* | 1/2021 | Peterson | B26B 21/4012 |

FOREIGN PATENT DOCUMENTS

| | | |
|---|---|---|
| WO | 1996010472 | 4/1996 |
| WO | 2005082584 | 9/2005 |
| WO | 2009142972 | 11/2009 |
| WO | 2015164509 | 10/2015 |
| WO | 2017161341 | 9/2017 |

OTHER PUBLICATIONS

European Patent Office Application Serial No. 20212140.6, Search Report dated Apr. 26, 2021, 8 pages.

* cited by examiner

RAZOR CARTRIDGE

CROSS-REFERENCE TO RELATED APPLICATIONS

Pursuant to 35 U.S.C. § 119(a), this application claims the benefit of earlier filing date and right of priority to Korean Patent Application Number 10-2019-0164112, filed on Dec. 10, 2019, the contents of which are incorporated by reference herein in its entirety.

TECHNICAL FIELD

The present disclosure relates to a razor cartridge.

BACKGROUND

The statements in this section merely provide background information related to the present disclosure and do not necessarily constitute prior art.

A conventional razor assembly, commonly known as a wet razor, includes a razor cartridge and a razor handle. The razor cartridge includes a blade housing, a guard portion, a cap portion, and at least one shaving blade disposed between the guard portion and the cap portion.

The blade housing is generally manufactured by injection molding plastic. Accordingly, when contacted by the user's skin, the conventional razor cartridge renders the blade housing to transfer the hardness of plastic to the user, resulting in a degraded shaving sensation.

In particular, when a user shaves an uneven area, for example, an area such as a chin, an armpit, etc., more regions of the blade housing come into contact with the user's skin, and the degradation may be worse.

In this regard, recent razor cartridges feature guard rubber. Made of rubber material, the guard rubber may be formed by injection molding on a plastic blade housing.

Since such a guard rubber is made of a rubber material having elasticity, it can stretch the user's skin more intensely. Additionally, the guard rubber has an effect of providing the user with a softer tactility compared to plastic material.

However, since the guard rubber is disposed on the blade housing only in a partial area in front of the shaving blade, the user when shaving is still bound to feel the hard touch of the plastic.

On the other hand, recent attempts are made to reduce irritation over the skin during shaving by using shaving aids such as shaving foam, shaving gel, and shaving cream. These shaving aids contain a lubricating component and may be applied to and used on the user's skin.

In general, a wet razor is used with moisture. This allows the shaving aid applied to the user's skin to be washed away from the razor cartridge by moisture during shaving. The moisture washes away shaving aids that are about to be used or could be reused.

This leads to short-lived function of the applied shaving aid or the use of an excessive amount of the shaving aid for a single shaving session.

SUMMARY

According to at least one embodiment, the present disclosure provides a razor cartridge including at least one shaving blade having a cutting edge, a blade housing configured to receive the at least one shaving blade in a longitudinal direction, and an edge portion disposed on each of both lateral sides of the blade housing and including a plurality of edge protrusions formed on a corresponding surface of each edge portion.

DETAILED DESCRIPTION

Figure 1A:
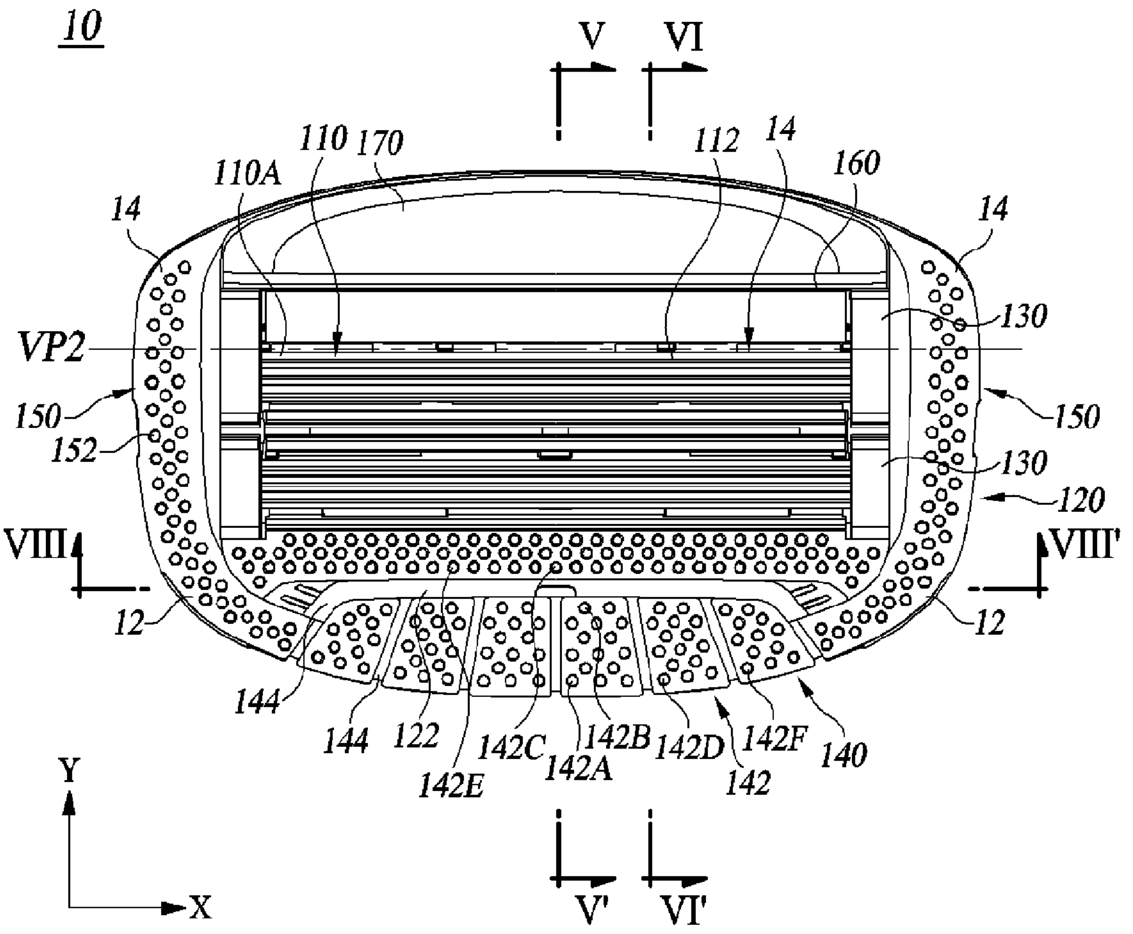
FIGS. 1A to 1C are front views of a razor cartridge according to at least one embodiment of the present disclosure.

At least one embodiment of the present disclosure seeks to provide a razor cartridge that can provide a soft, resilient touch to a user when shaving.

Further, the present disclosure seeks to provide a razor cartridge that can efficiently use the shaving aid applied to the user's skin.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric code such as first, second, i), ii), (a), (b), etc., in numbering components are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto.

Figure 1B:
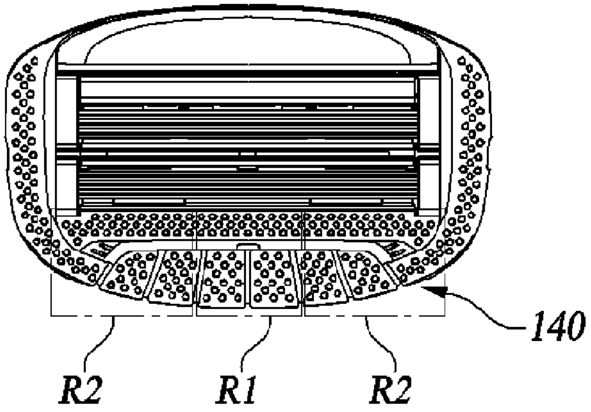
Figure 1C:
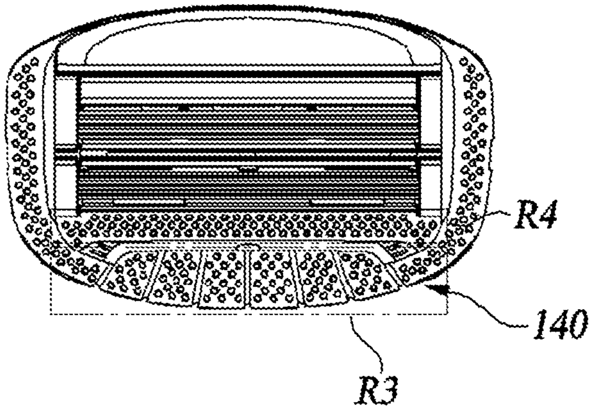

FIGS. 1A to 1C are front views of a razor cartridge 10 according to at least one embodiment of the present disclosure.

Specifically, FIG. 1A shows the razor cartridge 10 in front view, FIG. 1B showing the positions of a first region R1 and second regions R2 on a guard portion 140, and FIG. 1C showing the positions of a third region R3 and fourth regions R4 on the guard portion 140.

Figure 2:
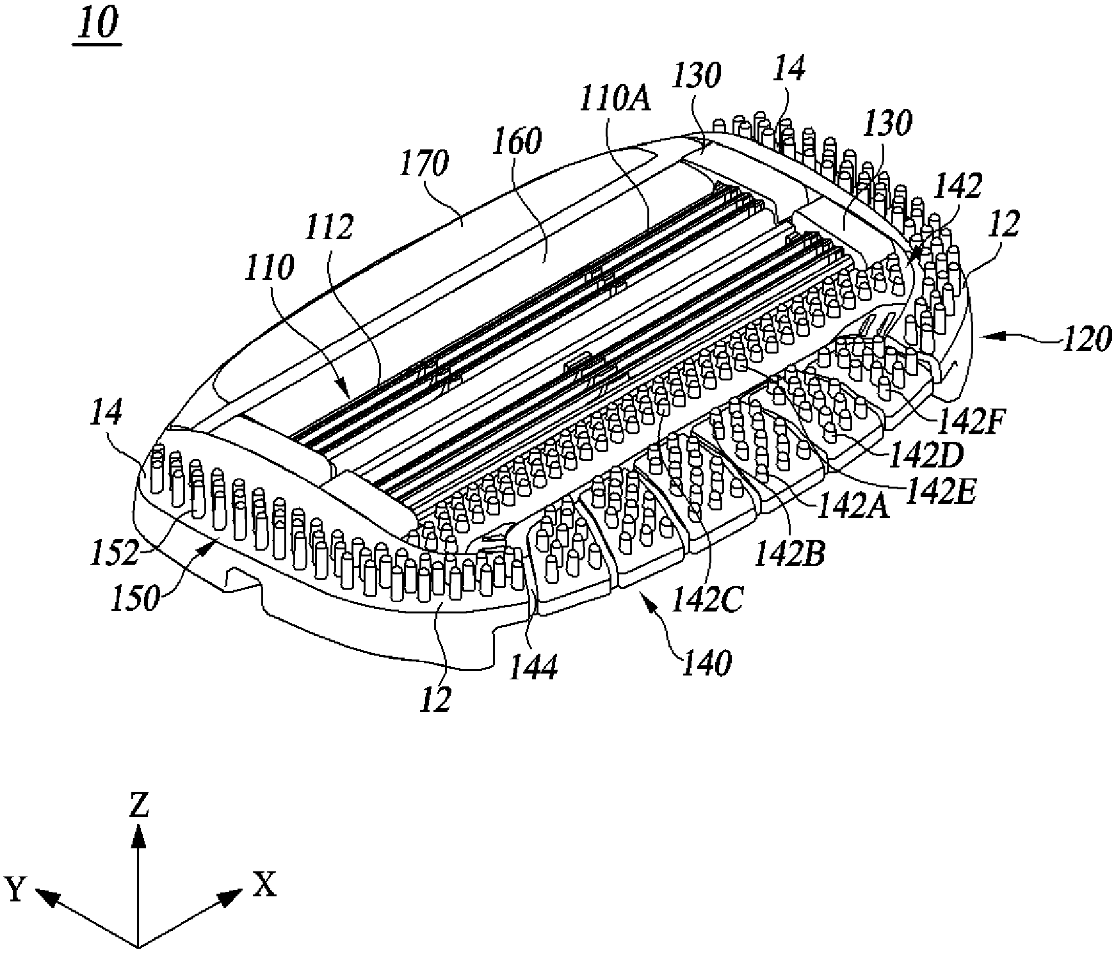
FIG. 2 is a perspective view of the razor cartridge according to at least one embodiment of the present disclosure.

FIG. 2 is a perspective view of the razor cartridge 10 according to at least one embodiment of the present disclosure.

Figure 3:
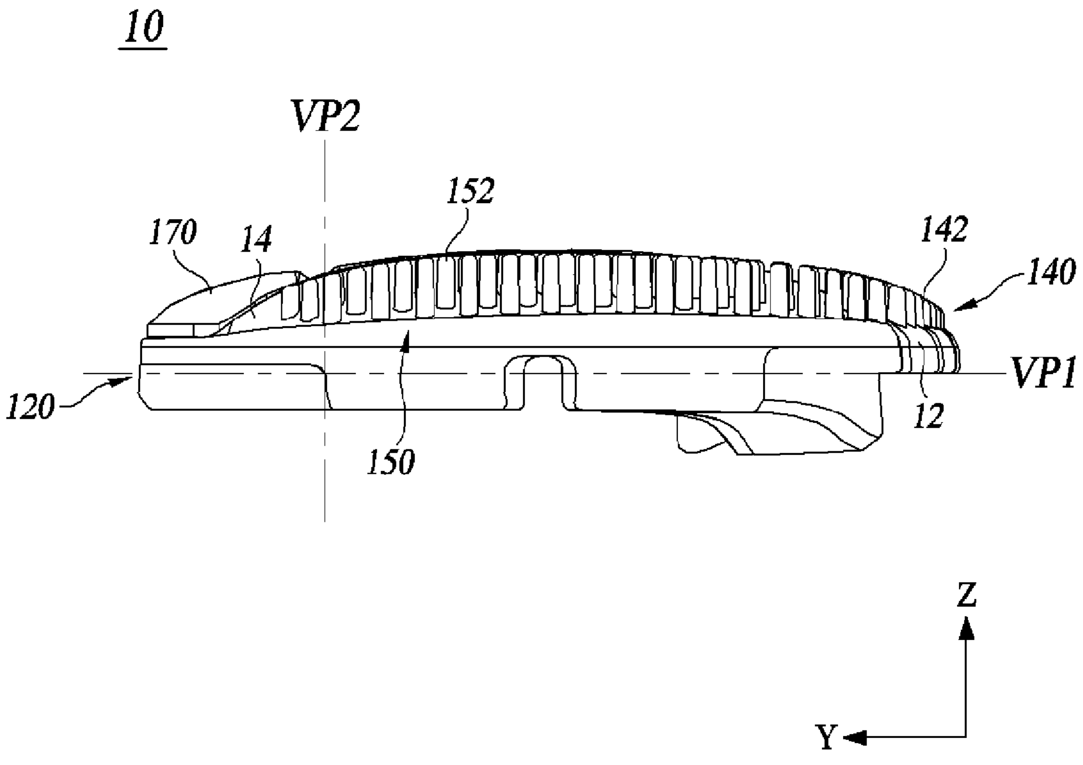
FIG. 3 is a side view of the razor cartridge according to at least one embodiment of the present disclosure.

FIG. 3 is a side view of the razor cartridge 10 according to at least one embodiment of the present disclosure.

As shown in FIGS. 1A, 2, and 3, the razor cartridge 10 may include a shaving blade 110A or at least one shaving blade 110, a blade housing 120, multiple clips 130, a guard portion 140, edge portions 150, a cap portion 160, and a lubricating band 170.

The one or more shaving blades 110 may each have a cutting edge 112.

The blade housing 120 may receive at least one shaving blade 110 in the longitudinal direction. Here, the longitudinal direction refers to the width direction of the blade housing 120. For example, in FIGS. 1A to 1C, the longitudinal direction is a direction parallel to the X-axis.

At least one shaving blade 110 as received in the blade housing 120 may be retained by the multiple clips 130.

The blade housing 120 may include a discharge portion 122.

The discharge portion 122 is configured to discharge the shaving aid delivered to the razor cartridge 10 over to the top side of the blade housing 120 to which the cutting edge 112 is directed.

Here, the shaving aid refers to various substances applied to the skin of a user to assist shaving. For example, the shaving aid may be one of shaving foam, shaving gel, and shaving cream, but the present disclosure is not limited thereto.

Additionally, the shaving aid may be a fluid material, but it may be other materials having fluidity. For example, the shaving aid may be a solid material in the form of a powder, or a fluid material containing a solid material.

In FIGS. 1A, 2, and 3, the shaving aid is shown to be discharged through the discharge portion 122 provided in the blade housing 120, but the present disclosure is not limited thereto.

For example, the shaving aid may be discharged from a discharge unit independent of a razor (not shown) and applied to the user's skin. In this case, the blade housing 120 may include none of the discharge portion 122 and a receiving portion 124 (shown in FIG. 4) for delivering the shaving aid to the discharge portion 122.

The shaving aid may run along channels 144 formed in the guard portion 140 and be evenly distributed over the razor cartridge 10.

The guard portion 140 may be disposed in front of at least one shaving blade 110 on the top side of the blade housing 120.

Here, the front and rear of the shaving blade 110 are defined based on the shaving direction of the razor cartridge 10. Accordingly, in FIGS. 1A to 1C, the front and the rear of the shaving blade 110 are, respectively, in the negative Y-axis direction and the positive Y-axis direction with respect to the shaving blade 110.

The guard portion 140, when shaving, may stretch the skin before the cutting of the body hair by the shaving blade 110.

This can erect the user's body hair in a direction perpendicular to the user's skin surface to facilitate the cutting of the body hair by the shaving blade 110.

The guard portion 140 may include multiple guard protrusions 142 formed on one surface of the guard portion 140.

The multiple guard protrusions 142 may protrude in a direction substantially perpendicular to the top side of the blade housing 120 on one surface of the guard portion 140. For example, the multiple guard protrusions 142 may protrude in the positive Z-axis direction of FIG. 2 on the one surface of the guard portion 140. However, the present disclosure is not limited to this particular configuration.

The multiple guard protrusions 142 may be made of an elastic material, which can provide a soft, resilient touch to the user's skin. However, the present disclosure is not limited thereto, and the multiple guard protrusions 142 may be made of a material other than an elastic material.

The guard protrusions 142 may have a shape of a cylinder or a polygonal column, although the present disclosure is not limited thereto. For example, the guard protrusions 142 may have a shape elongated in the longitudinal or transverse direction. Alternatively, some of the guard protrusions 142 may have a shape of a pillar, while another portion thereof may have a shape elongated in the longitudinal direction or the transverse direction.

Here, the transverse direction may be a direction parallel to the shaving direction. For example, in FIGS. 1A to 1C, the transverse direction is a direction parallel to the Y-axis.

The multiple guard protrusions 142 according to at least one embodiment may be evenly distributed and disposed on the one surface of the guard portion 140. This allows the razor cartridge 10 according to at least one embodiment to provide a soft, resilient touch to the user's skin during shaving.

Additionally, the multiple guard protrusions 142 according to at least one embodiment are configured to reserve a shaving aid in the space between the multiple guard protrusions 142. This enables the razor cartridge 10 according to at least one embodiment to provide the shaving aid to the user's skin for an extended duration.

Further, the guard protrusions 142 according to at least one embodiment expand the entire surface area of the guard portion 140, thereby increasing the contact area between the guard portion 140 and the user's skin. This allows the guard portion 140 according to at least one embodiment to more effectively stretch the user's skin when shaving.

Additionally, the guard protrusions 142 according to at least one embodiment feature different protruding heights and different protruding lengths depending on the position where the guard protrusions 142 are disposed.

This enables the guard protrusions 142 to have different effects in each of the regions of the guard portion 140. The relevant description will be detailed with reference to FIGS. 5 to 8.

In the present specification, the protruding height of protrusions 142 and 152 refers to the distance to the tip of each of the protrusions 142, 152 from a first virtual plane VP1 substantially parallel to the top side of the blade housing 120. Further, in the present specification, the protruding length of the protrusions 142 and 152 refers to the distance to the tip of each of the protrusions 142, 152 from the point at which each of the protrusions 142 and 152 protrudes.

As shown in FIGS. 1A, 2, and 3, the edge portion 150 may be disposed on each of both lateral sides of the blade housing 120.

The edge portions 150 may each include multiple edge protrusions 152 formed on a corresponding surface of each edge portion 150.

The multiple edge protrusions 152 may protrude in a direction substantially perpendicular to the top side of the blade housing 120 on the one surface of the edge portion 150, but the present disclosure is not limited thereto.

The multiple edge protrusions 152 may be made of an elastic material, which allows providing a soft, resilient touch to the user's skin. However, the present disclosure is not limited to this particular configuration, and the edge protrusions 152 may be made of a material other than an elastic material.

The edge protrusions 152 may have a shape of a cylinder or a polygonal column, although the present disclosure is not limited thereto. For example, the edge protrusions 152 may have a shape elongated in the longitudinal or transverse direction. Alternatively, some of the edge protrusions 152 may have a shape of a pillar, while another portion thereof may have a shape elongated in the longitudinal direction or the transverse direction.

The multiple edge protrusions 152 may have the same shape as the multiple guard protrusions 142, but they may have different shapes.

Additionally, the edge protrusions 152 may generally have a larger protruding height than the guard protrusions 142.

Accordingly, the edge protrusions 152 according to at least one embodiment may have better contact with the user's skin as compared to the guard protrusions 142.

Further, the multiple edge protrusions 152 may generally have a larger protruding length than the multiple guard protrusions 142. As the protruding length of the protrusions 142 and 152 increases, the magnitude of the frictional force generated between the protrusions 142 and 152 and the user's skin may decrease. Accordingly, the edge protrusions 152 may provide a softer feeling or touch to the user's skin compared to the guard protrusions 142.

Additionally, the multiple edge protrusions 152 according to at least one embodiment can reserve a shaving aid in the space therebetween. This enables the razor cartridge 10 according to at least one embodiment to provide the shaving aid at both side regions of the blade housing 120 to the user's skin for an extended duration.

The edge protrusions 152 according to at least one embodiment feature their arrangement on both sides of the blade housing 120.

Accordingly, the razor cartridge 10 according to at least one embodiment when used for shaving an uneven area renders the edge protrusions 152 to contact a portion of the curved area and thereby effects providing a softer touch to the skin of the user and smoothing the skin in the curved area.

On the other hand, the edge portions 150 may each include a front corner region 12 and a rear corner region 14.

The front corner region 12 may be an area in front of the edge portion 150, and at least some of the front corner region 12 may overlap with the guard portion 140.

The rear corner region 14 may be an area disposed behind the edge portion 150.

Specifically, the rear corner region 14 may be placed beyond a second virtual plane VP2 that is perpendicular to the transverse direction or the Y-axis and including the rearmost shaving blade 110A of the one or more shaving blades 110.

The multiple edge protrusions 152 may be formed in an evenly distributed arrangement from the front corner region 12 to the rear corner region 14. Accordingly, the multiple edge protrusions 152 according to at least one embodiment may be in contact with the user's skin over a wider area.

On the other hand, the protruding height of the multiple edge protrusions 152 may tend to increase and then decrease back to lower values from the front corner region 12 toward the rear corner region 14. Accordingly, the multiple edge protrusions 152 may form a convex curved profile at one end thereof.

The guard portion 140 and the edge portion 150 may be injection-molded on the blade housing 120, but the present disclosure is not limited thereto.

The cap portion 160 may be disposed rearwardly of the at least one shaving blade 110. The cap portion 160 may be made of rubber material to increase the user's contact with the skin, although the present disclosure is not limited thereto.

The lubricating band 170 may be disposed on the cap portion 160 or may be disposed adjacent thereto. The lubricating band 170 may include a lubricating material which may be applied to the user's skin when shaving.

The lubricating band 170 may be attached to the blade housing 120 by extrusion molding or injection molding, or it may be formed by injection molding on the blade housing 120. However, the present disclosure is not limited to these particular methods of formation of the lubricating band 170.

As shown in FIGS. 1B and 10, the guard portion 140 includes a first region R1, second regions R2, a third region R3 and fourth regions R4.

The first region R1 of the guard portion 140 may be disposed adjacent to the central region thereof, and the second regions R2 may be disposed on both longitudinal sides of the first region R1.

The third region R3 of the guard portion 140 may be disposed adjacent to the front area thereof, and the fourth regions R4 may be disposed adjacent to the rear of the third region R3.

At least some of the third region R3 and at least some of the fourth regions R4 may overlap the first region R1 and the second regions R2.

The first region R1 and the second regions R2 are named for indicating relative positions along the longitudinal direction on the guard portion 140, and they are not necessarily limited to the particular positions in the guard portion 140.

Similarly, the third region R3 and the fourth regions R4 are for indicating relative positions along the transverse direction on the guard portion 140, and they are not necessarily limited to the particular positions in the guard portion 140.

In FIGS. 1A to 3, the razor cartridge 10 according to at least one embodiment is shown to include all of the multiple guard protrusions 142 and the multiple edge protrusions 152, although the present disclosure is not limited thereto.

For example, the razor cartridge 10 may include either the multiple guard protrusions 142 or the multiple edge protrusions 152.

Further, in FIGS. 1A to 3, the razor cartridge 10 according to at least one embodiment is illustrated as having the guard portion 140 and the edge portions 150 formed with the guard protrusions 142 and the edge protrusions 152, respectively, although the present disclosure is not limited thereto.

For example, the razor cartridge 10 may have a plurality of protrusions (not shown) formed on the top side of the blade housing 120 over the entire regions thereof except where the one or more shaving blades 110 are disposed.

Figure 4:
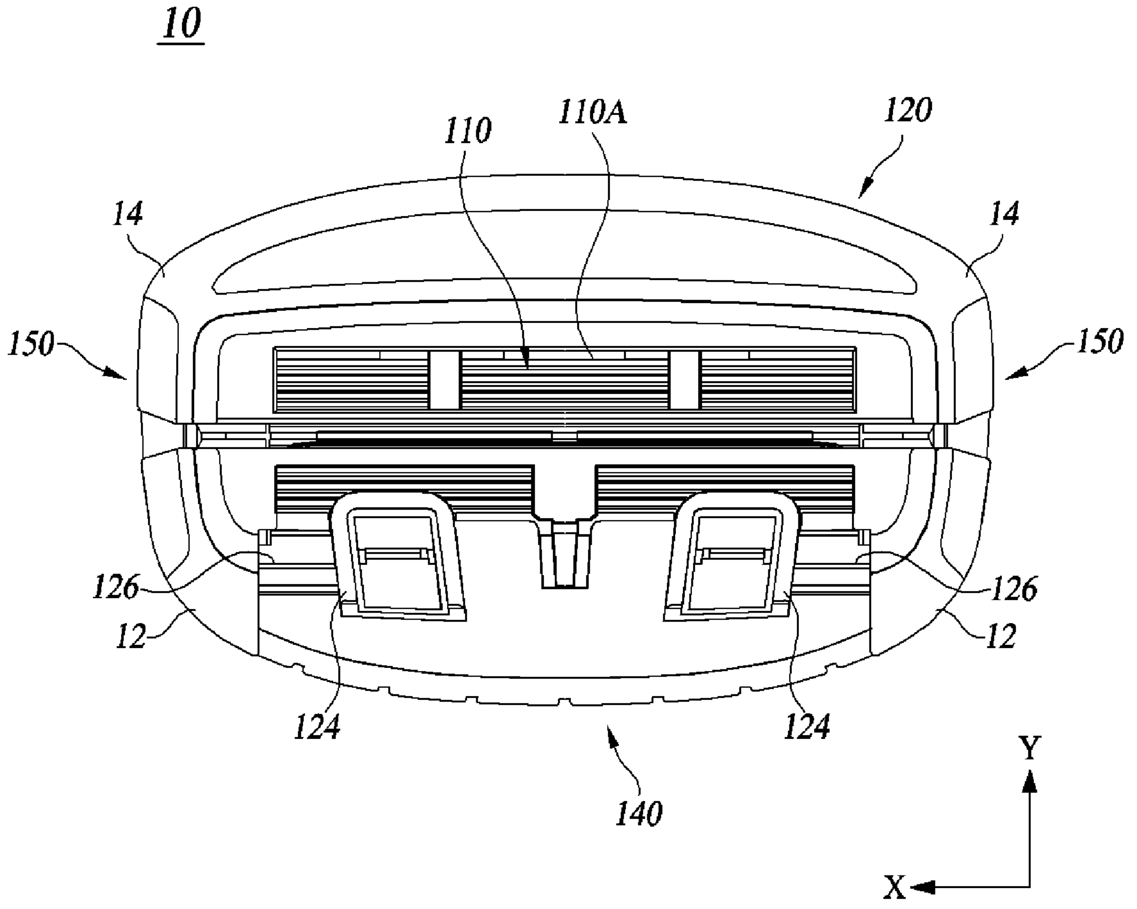
FIG. 4 is a rear view of the razor cartridge according to at least one embodiment of the present disclosure.

FIG. 4 is a rear view of the razor cartridge 10 according to at least one embodiment of the present disclosure.

As shown in FIG. 4, the blade housing 120 may have a bottom side on which receiving portions 124 and connecting portions 126 are positioned.

The receiving portions 124 may receive a shaving aid delivered from an aid providing portion (not shown) disposed on a razor handle (not shown) and transfer the received shaving aid to the discharge portion 122 disposed on the top side of the blade housing 120.

The connecting portions 126 may be connected to a razor handle (not shown), or they may be connected to a connector (not shown) for interconnecting the razor cartridge 10 and the razor handle. For example, the connecting portions 126 may be pivotally connected to the razor handle or the connector, although the present disclosure is not limited to such particular configurations.

Figure 5:
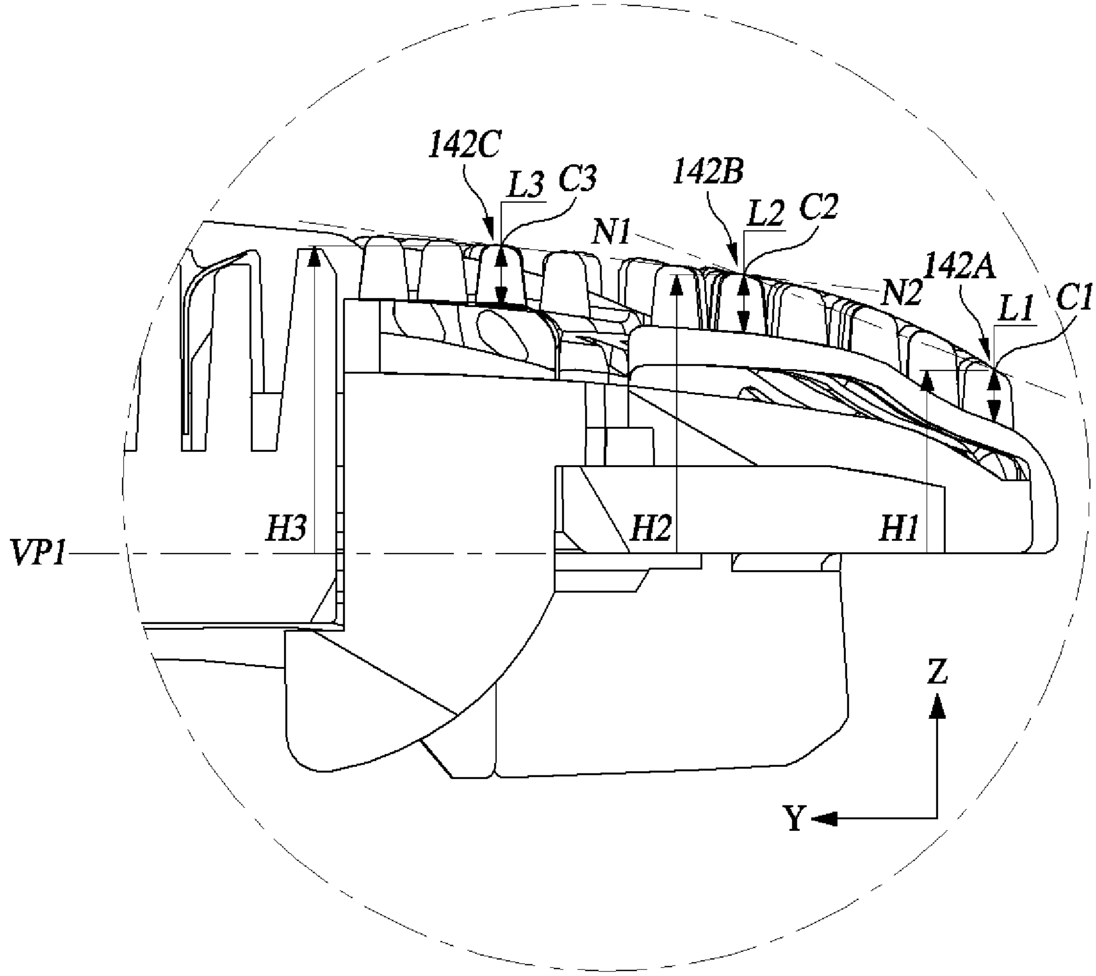
FIG. 5 is a cross-sectional view of the razor cartridge according to at least one embodiment of the present disclosure, taken in the direction V-V' of FIG. 1A.

FIG. 5 is a cross-sectional view of the razor cartridge 10 according to at least one embodiment of the present disclosure, taken in the direction V-V' of FIG. 1A.

As shown in FIG. 5, the multiple guard protrusions 142 may include first protrusions 142A, second protrusions 142B, and third protrusions 142C in at least some of the guard portion 140.

The first protrusions 142A, the second protrusions 142B, and the third protrusions 142C may be disposed in the first region R1 (FIG. 1B) of the guard portion 140, which is adjacent to the central region thereof.

The first protrusions 142A may have a first protruding height H1.

The second protrusions 142B may be disposed rearwardly of the first protrusions 142A, and the second protrusions 142B may have a second protruding height H2 greater than the first protruding height H1.

The third protrusions 142C may be disposed rearwardly of the second protrusions 142B, and the third protrusions 142C may have a third protruding height H3 that is greater than the second protruding height H2.

Accordingly, the multiple guard protrusions 142 may have their protruding height increased toward the rear of the guard portion 140 in the first region R1 of the guard portion 140.

Further, the slope of a first virtual line N1 passing through one ends of the first protrusions 142A and one ends of the second protrusions 142B may be greater than the slope of a second virtual line N2 passing through one ends of the second protrusions 142B and one ends of the third protrusions 142C.

In the present specification, the slope of a virtual line passing through the one ends of the two protrusions refers to an angle formed between the virtual line and the first virtual reference plane VP1.

Further, the multiple guard protrusions 142 disposed in the first region R1 of the guard portion 140 may vary in height such that the guard protrusions 142 are higher towards the rear of the guard portion 140 at a decreasing rate of protruding height.

Accordingly, the guard portion 140 according to at least one embodiment can provide a smooth curved surface formed on the first region R1 by varying the protruding height and the increase rate of the protruding height of the multiple guard protrusions 142 disposed in the first region R1. Accordingly, the razor cartridge 10 according to at least one embodiment of the present disclosure can provide a user-friendly soft shaving feel.

The first protrusions 142A may have a first protruding length L1, the second protrusions 1428 may have a second protruding length L2 that is greater than the first protruding length L1, and the third protrusions 142C may have a third protruding length L3 greater than the second protruding length L2.

The shorter the protruding length of the protrusions 142 and 152, the greater the magnitude of the frictional force generated between the protrusions 142, 152 and the user's skin. Additionally, stretching of the skin by the guard portion 140 may be greatest in a front area of the first region R1 of the guard portion 140.

Accordingly, the guard portion 140 according to at least one embodiment has a relatively small protruding length of the first protrusions 142A disposed in the front within the first region R1 and thereby provides a more appropriate stretching effect on the skin.

At the same time, the guard portion 140 according to at least one embodiment has a relatively greater protruding length of the third protrusions 142C disposed at the rear within the first region R1, thereby providing a soft touch effect to the user's skin.

The first protrusions 142A may each include a first skin contact surface C1 formed at one end thereof.

The second protrusions 1428 may each include a second skin contact surface C2 formed at one end thereof. The second skin contact surface C2 may have a smaller area than the first skin contact surface C1.

The third protrusions 142C may each include a third skin contact surface C3 formed at one end thereof. The third skin contact surface C3 may have a smaller area than the second skin contact surface C2.

As described above, the stretching by the guard portion 140 may be greatest in front of the first region R1 of the guard portion 140.

Accordingly, the guard portion 140 according to the exemplary embodiment of the present disclosure relatively increases the skin contact surface of the first protrusions 142A disposed in front of the first region R1, which can better maintain appropriate contact with the user's skin.

Further, an area difference between the first skin contact surface C1 and the second skin contact surface C2 may be greater than an area difference between the second skin contact surface C2 and the third skin contact surface C3. In other words, the multiple guard protrusions 142 disposed in the first region R1 of the guard portion 140 may vary in area such that the guard protrusions 142 are lower at a decreasing rate of skin contact surface area toward the rear of the guard portion 140.

This allows the guard portion 140 according to at least one embodiment to provide the user with a softer shaving feel.

The first protrusions 142A, the second protrusions 142B, and the third protrusions 142C may be disposed along the transverse direction within the first region R1 of the guard portion 140.

In this case, the first protrusions 142A, the second protrusions 142B, and the third protrusions 142C may be arranged in alignment along the transverse direction or may be arranged out of alignment from each other along the transverse direction.

The first protrusions 142A, the second protrusions 142B, and the third protrusions 142C are named to indicate the relative positions of the guard protrusions 142 on the first region R1 of the guard portion 140 along the transverse direction, but they are not necessarily limited to the guard protrusions 142 at specific positions among the multiple guard protrusions 142.

Figure 6:
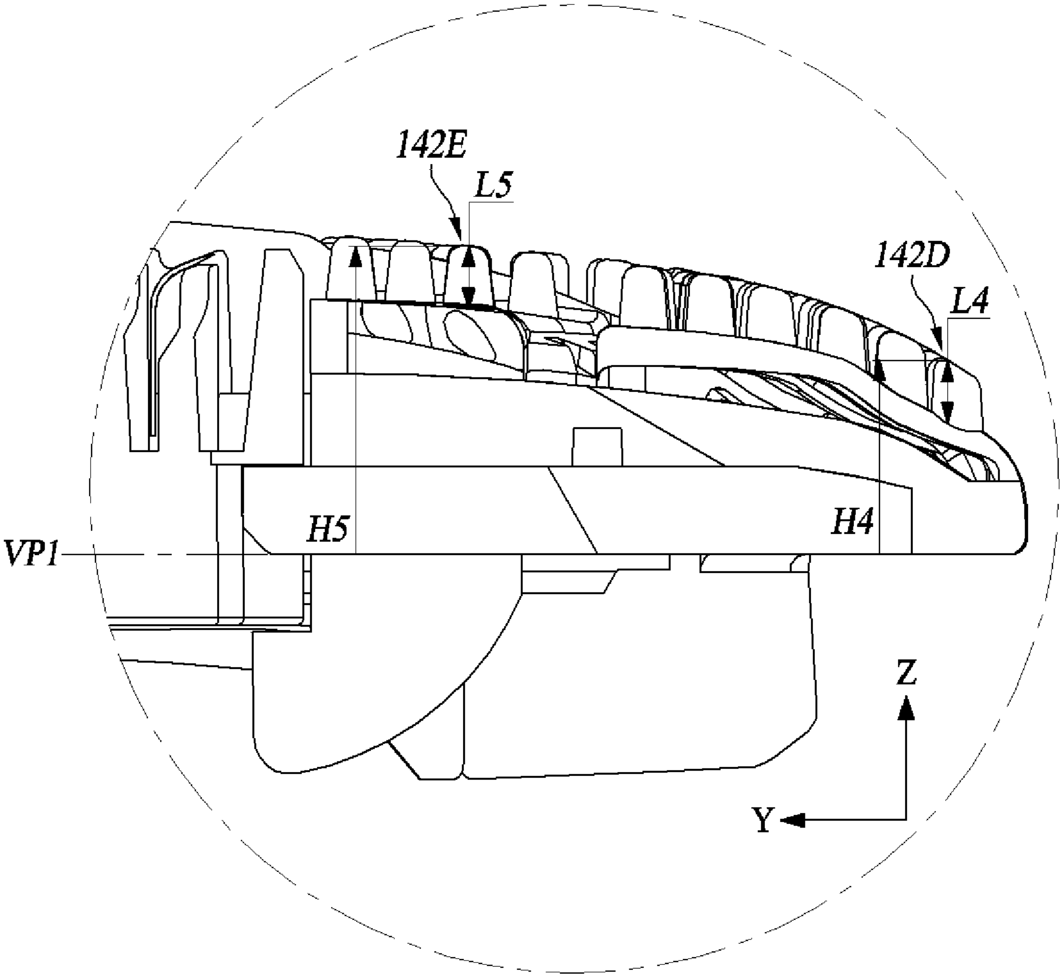
FIG. 6 is a cross-sectional view of the razor cartridge according to at least one embodiment of the present disclosure, taken in the direction VI-VI' of FIG. 1A.

FIG. 6 is a cross-sectional view of the razor cartridge 10 according to at least one embodiment of the present disclosure, taken in the direction VI-VI' of FIG. 1A.

As shown in FIG. 6, the multiple guard protrusions 142 may include fourth protrusions 142D and fifth protrusions 142E in the second regions (R2 of FIG. 1B) of the guard portion 140.

At least some of each second region R2 may be adjacent to one longitudinal side of the first region R1. Accordingly, the second regions R2 may be disposed on both longitudinal sides of the first region R1 on the guard portion 140.

The fourth protrusions 142D may have a fourth protruding height H4 and a fourth protruding length L4.

The fifth protrusions 142E may be disposed behind the fourth protrusions 142D. The fifth protrusions 142E may have a fifth protruding height H5 greater than the fourth protruding height H4, and they may have a fifth protruding length L5 smaller than the fourth protruding length L4.

Stretching by the guard portion 140 may be relatively small in the front areas of the second regions R2 of the guard portion 140.

Accordingly, the guard portion 140 according to the embodiment of the present disclosure has relatively increased protruding length of the fourth protrusions 142D disposed in front of the second regions R2, thereby providing a soft touch effect on the user's skin by the area in front of the guard portion 140.

The fourth protrusions 142D and the fifth protrusions 142E may be disposed along the transverse direction. In this case, the fourth protrusions 142D and the fifth protrusions 142E may be arranged in alignment along the transverse direction or may be arranged out of alignment from each other along the transverse direction.

The fourth protrusions 142D and the fifth protrusions 142E represent the relative positions of the guard protrusions 142 along the transverse direction on the second regions R2 of the guard portion 140, but they are not necessarily limited to the guard protrusions 142 at specific positions among the multiple guard protrusions 142.

Figure 7:
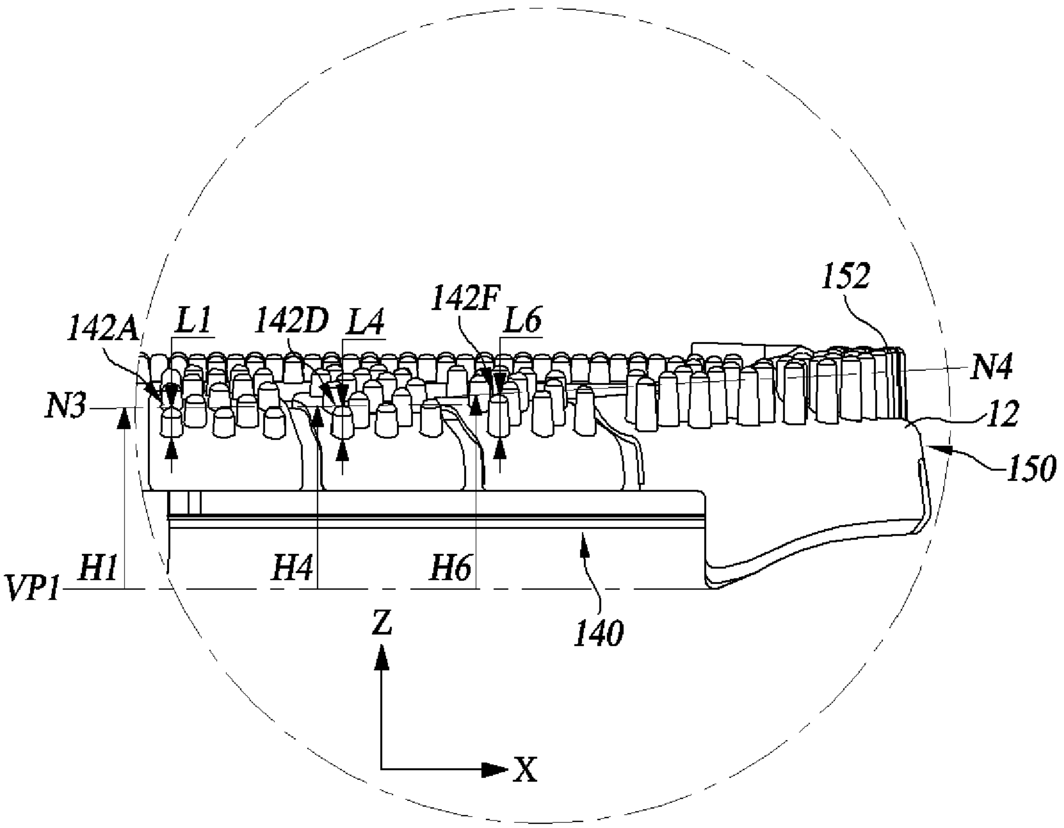
FIG. 7 is a bottom view of the razor cartridge according to at least one embodiment of the present disclosure.

FIG. 7 is a bottom view of the razor cartridge 10 according to at least one embodiment of the present disclosure.

As shown in FIG. 7, the multiple guard protrusions 142 may include sixth protrusions 142F.

The sixth protrusions 142F may be disposed within the second regions R2 to be spaced longitudinally outwardly apart from the fourth protrusions 142D.

Alternatively, the first protrusions 142A, the fourth protrusions 142D, and the sixth protrusions 142F may be placed in the third region R3 (FIG. 10) of the guard portion 140.

The third region R3 is one adjacent to the front of the guard portion 140, and at least some of the third region R3 may overlap the first region R1 and the second region R2.

The fourth protrusions 142D may have a fourth protruding height H4 greater than the first protruding height H1, and the sixth protrusions 142F may have a height H6 greater than the fourth protruding height H4.

Accordingly, the multiple guard protrusions 142 in the third region R3 of the guard portion 140 may have their protruding height increased from the center of the guard portion 140 toward the edge portions 150 disposed on both sides of the blade housing 120.

Specifically, the multiple guard protrusions 142 in the third region R3 of the guard portion 140 may have their protruding height increased from the center of the guard portion 140 toward the front corner regions 12.

Additionally, the slope of a third virtual line N3 passing through one ends of the first protrusions 142A and one ends of the fourth protrusions 142D may be smaller than the slope of a fourth virtual line N4 passing through the one ends of the fourth protrusions 142D and one ends the sixth protrusions 142F.

Further, the multiple guard protrusions 142 disposed in at least a partial region of the guard portion 140 may vary in height such that the guard protrusions 142 are higher at an increasing rate of protruding height towards the front corner regions 12 or edge portions 50 from the center of the guard portion 140.

Accordingly, the multiple guard protrusions 142 according to at least one embodiment may have one ends configured to have varying protruding heights and varying increase rates of protruding heights and thereby form a downwardly concave curved profile.

This enables the razor cartridge 10 according to at least one embodiment to naturally hug the user's skin by the third region R3 of the guard portion 140, thereby providing the user with a better shaving feel.

On the other hand, the fourth protrusions 142D may have a fourth protruding length L4 that is greater than the first protruding length L1, and the sixth protrusions 142F may have a sixth protruding length L6 greater than the fourth protruding length L4.

The shorter the protruding length of the protrusions 142 and 152, the greater the magnitude of the frictional force generated between the protrusions 142, 152 and the user's skin.

Accordingly, the guard portion 140 according to at least one embodiment has a relatively small protruding length of the first protrusions 142A disposed centrally of the third region R3 and thereby provides a more appropriate stretching effect on the skin.

At the same time, the guard portion 140 according to at least one embodiment has a relatively greater protruding length of the sixth protrusions 142F disposed at the rear within the third region R3, thereby providing a soft touch effect to the user's skin.

The first protrusions 142A, the fourth protrusions 142D, and the sixth protrusions 142F may be arranged along the longitudinal direction within the third region R3 of the guard portion 140.

In this case, the first protrusions 142A, the fourth protrusions 142D, and the sixth protrusions 142F may be arranged in alignment along the longitudinal direction or they may be arranged out of alignment from each other along the longitudinal direction.

The first protrusions 142A, the fourth protrusions 142D, and the sixth protrusions 142F represent the relative positions of the guard protrusions 142 along the longitudinal direction on the third region R3 of the guard portion 140, but they are not necessarily limited to the guard protrusions 142 at specific positions among the multiple guard protrusions 142.

Figure 8:
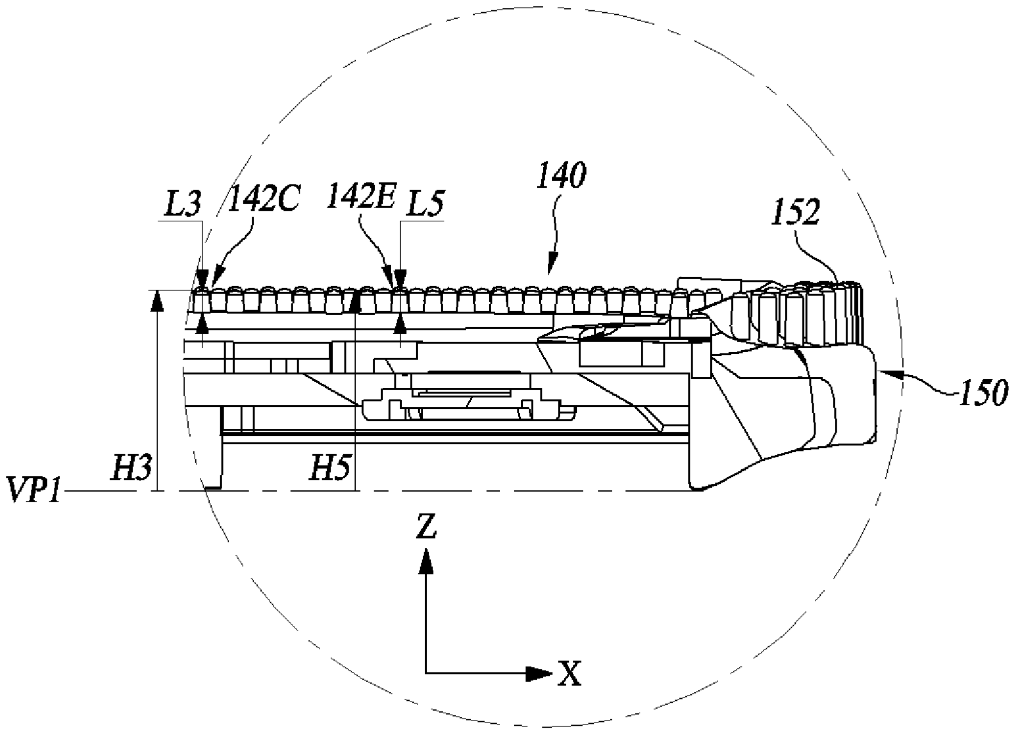
FIG. 8 is a cross-sectional view of the razor cartridge according to at least one embodiment of the present disclosure, taken in the direction VIII-VIII' of FIG. 1A.

FIG. 8 is a cross-sectional view of the razor cartridge 10 according to at least one embodiment of the present disclosure, taken in the direction VIII-VIII' of FIG. 1A.

As shown in FIG. 8, the fifth protrusions 142E may be disposed to be spaced longitudinally outwardly apart from the third protrusions 142C.

The third protrusions 142C and the fifth protrusions 142E may be disposed in the fourth regions R4 (FIG. 10) of the guard portion 140.

The fourth regions R4 are adjacent to the rear of the third region R3, and at least some of the fourth regions R4 may overlap the first region R1 and the second regions R2.

The difference between fifth protruding height H5 and third protruding height H3 may be smaller than the difference between fourth protruding height H4 and first protruding height H1.

In other words, the multiple guard protrusions 142 that are disposed in the fourth regions R4 may have a relatively uniform protruding height compared to the multiple guard protrusions 142 that are disposed in the third region R3.

The third protrusions 142C and the fifth protrusions 142E may be disposed in the fourth regions R4 of the guard portion 140 along the longitudinal direction.

In this case, the third protrusions 142C and the fifth protrusions 142E may be arranged in alignment along the longitudinal direction or they may be arranged out of alignment from each other along the longitudinal direction.

The third protrusions 142C and the fifth protrusions 142E represent the relative positions of the guard protrusions 142 along the longitudinal direction on the fourth region R4 of the guard portion 140, but they are not necessarily limited to the guard protrusions 142 at specific positions among the multiple guard protrusions 142.

As described above, the razor cartridge according to some embodiments of the present disclosure has an effect of providing a soft, resilient touch to the user during shaving.

Further, the present disclosure allows efficient use of a shaving aid.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A razor cartridge, comprising:

at least one shaving blade having a cutting edge;

a blade housing configured to receive the at least one shaving blade;

a guard portion disposed in front of the at least one shaving blade and including a plurality of guard protrusions formed on one surface of the guard portion; and an edge portion disposed on each of both lateral sides of the blade housing, wherein heights of some of the guard protrusions in at least a partial region of the guard portion increase from a center of the guard portion toward the edge portions, wherein the plurality of guard protrusions in the at least a partial region comprise first guard protrusions having a first guard protruding length, fourth guard protrusions spaced longitudinally outwardly apart from the first guard protrusions and having a fourth guard protruding length greater than the first guard protruding length, and sixth guard protrusions spaced longitudinally outwardly apart from the fourth guard protrusions and having a sixth guard protruding length greater than the fourth guard protruding length.

* * * * *